US012627892B2

(12) United States Patent　　(10) Patent No.: US 12,627,892 B2
Kimura　　　　　　　　　　　　　(45) Date of Patent: May 12, 2026

(54) DYNAMIC INPUT/OUTPUT CHARACTERISTIC CONTROL APPARATUS FOR IMAGING SYSTEM, CONTROL METHOD, AND STORAGE MEDIUM

(71) Applicant: CANON KABUSHIKI KAISHA, Tokyo (JP)

(72) Inventor: Takao Kimura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 20 days.

(21) Appl. No.: 18/741,497

(22) Filed: Jun. 12, 2024

(65) Prior Publication Data

US 2024/0430572 A1　　Dec. 26, 2024

(30) Foreign Application Priority Data

Jun. 23, 2023　(JP) ................................. 2023-103416

(51) Int. Cl.
H04N 23/695　　　(2023.01)
(52) U.S. Cl.
CPC ................................. H04N 23/695 (2023.01)
(58) Field of Classification Search
CPC .............................. H04N 23/695; H04N 23/69
See application file for complete search history.

(56) References Cited

U.S. PATENT DOCUMENTS

2021/0058557 A1 * 2/2021 Koga ...................... H04N 23/62

FOREIGN PATENT DOCUMENTS

JP 　 2010114521 A 　 5/2010

* cited by examiner

*Primary Examiner* — Christopher K Peterson
(74) *Attorney, Agent, or Firm* — Canon U.S.A., Inc. IP Division

(57)　　　　　ABSTRACT

A control apparatus includes at least one memory, and at least one processor to select an imaging device operated from at least one imaging device connected to the control apparatus, acquire information indicating whether the selected imaging device is performing distribution, acquire an input signal for instructing a driving mechanism of the selected imaging device on a driving speed in a pan or tilt direction, and determine a control signal corresponding to the acquired input signal, the control signal being a signal that is output to the driving mechanism and that instructs the driving mechanism on a driving speed, wherein the control signal corresponding to the input signal is determined based on a first input/output characteristic in a case where the selected imaging device is performing distribution, and the control signal is determined based on a second input/output characteristic in a case where the imaging device is not performing distribution.

14 Claims, 6 Drawing Sheets

DRIVING
SPEED V

Vmax

SECOND INPUT/OUTPUT
CHARACTERISTIC
(NOT DISTRIBUTING)

V1max

V2

V1

FIRST INPUT/OUTPUT
CHARACTERISTIC
(DISTRIBUTING)

0      X1      Xmax

SHIFT AMOUNT X

DYNAMIC INPUT/OUTPUT CHARACTERISTIC CONTROL APPARATUS FOR IMAGING SYSTEM, CONTROL METHOD, AND STORAGE MEDIUM

BACKGROUND

Field

The present relates to a control apparatus, a control method, and a storage medium.

Description of the Related Art

In recent years, in the field of video production, there have been increasing opportunities to use a camera capable of remotely operating the imaging direction of the camera in a pan direction or a tilt direction. Japanese Patent Application Laid-Open No. 2010-114521 discusses a control apparatus for controlling the imaging direction of a camera, which includes an adjustment unit for adjusting an upper limit value for the driving speed of the camera in the pan direction or tilt direction.

SUMMARY

According to an aspect of the present disclosure, a control apparatus includes at least one memory storing instructions, and at least one processor that, upon execution of the stored instructions cause the at least one processor to select an imaging device to be operated from at least one imaging device communicatively connected to the control apparatus, acquire information indicating whether the selected at least one imaging device is performing distribution, acquire an input signal for instructing a driving mechanism of the selected imaging device for changing an imaging direction of the selected at least one imaging device on a driving speed in a pan direction or a tilt direction, and determine a control signal corresponding to the acquired input signal using the acquired information, the control signal being a signal that is output to the driving mechanism and that instructs the driving mechanism on a driving speed, wherein the control signal corresponding to the input signal is determined based on a first input/output characteristic in a case where the selected at least one imaging device is performing distribution, and the control signal corresponding to the input signal is determined based on a second input/output characteristic different from the first input/output characteristic in a case where the imaging device is not performing distribution.

Further features of the present disclosure will become apparent from the following description of exemplary embodiments with reference to the attached drawings.

DESCRIPTION OF THE EMBODIMENTS

Hereinafter, exemplary embodiments for carrying out the present disclosure will be described in detail with reference to the drawings. The exemplary embodiments to be described are examples of means of practicing the present disclosure, and should be modified or changed as appropriate depending on the configuration of an apparatus to which the present disclosure is applied and various conditions, and the present disclosure is not limited to the embodiments. A part of each exemplary embodiment described below may be appropriately combined.

(Configuration of Imaging System)

Figure 1:
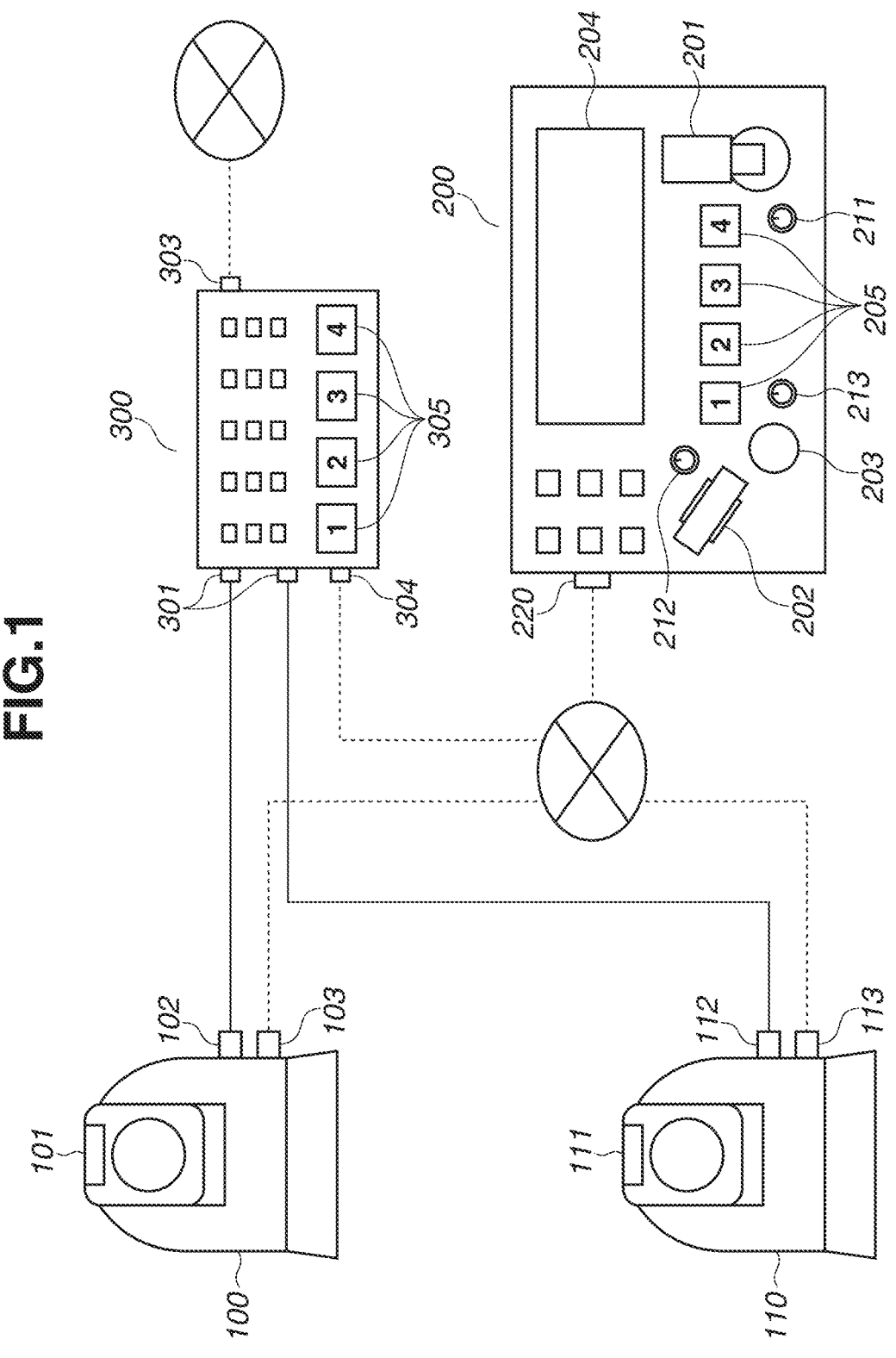
FIG. 1 is a configuration diagram of an imaging system.

FIG. 1 is a diagram illustrating a configuration of an imaging system including a control apparatus 200 according to a first exemplary embodiment. The imaging system includes the control apparatus 200, pan-tilt-zoom (PTZ) cameras 100 and 110, and a switcher 300. One or more PTZ cameras may be provided.

(PTZ Camera)

The PTZ cameras 100 and 110 are cameras capable of PTZ operation. The PTZ cameras 100 and 110 respectively include video output terminals 102 and 112, control communication terminals 103 and 113, tally lamps 101 and 111, and pan driving units, tilt driving units, zoom driving units, and focus driving units (not illustrated).

The video output terminals 102 and 112 are terminals that output video captured by the PTZ cameras 100 and 110, and standards such as serial digital interface (SDI) and high-definition multimedia interface (HDMI)® are given as examples.

Video outputting is not limited to the above examples, and may be a communication standard such as Ethernet in which video is packetized by internet protocol (IP).

The control communication terminals 103 and 113 are terminals for receiving a control signal output (transmitted) from the control apparatus 200, and an example of the control communication terminals is an IP communication standard such as Ethernet. The standard is not limited to the example, and may be a serial communication standard such as recommended standard 422 (RS-422).

The pan driving unit and the tilt driving unit are motor mechanisms for changing the imaging directions of the PTZ cameras 100 and 110 in a pan direction and a tilt direction, respectively. The pan driving unit and the tilt driving unit are driven on the basis of control signals input from the control apparatus 200 via the control communication terminals 103 and 113.

The zoom driving unit is a motor mechanism for moving the zoom lens of the PTZ cameras 100 and 110 in the optical axis direction to change the imaging angle of view. The zoom driving unit is driven on the basis of a control signal input from the control apparatus 200 via the control communication terminals 103 and 113.

The focus driving unit is a motor mechanism for moving the focus lens of the PTZ cameras 100 and 110 in the optical axis direction to change the focal length. The focus driving unit is driven on the basis of a control signal input from the control apparatus 200 via the control communication terminals 103 and 113.

The tally lamps 101 and 111 are turned on in accordance with the distribution states of the PTZ cameras 100 and 110, respectively. For example, the PTZ cameras 100 and 110 are turned on in red when the PTZ cameras 100 and 200 are performing distribution, and are turned on in green when the PTZ cameras 100 and 200 are in a non-distribution state, and thus the user can recognize a video of which camera among the plurality of connected cameras is being distributed. The distribution state is selected by the switcher 300 to be described below.

(Control Apparatus)

The control apparatus 200 includes a pan/tilt operation unit 201, a zoom operation unit 202, a focus operation unit 203, a control communication terminal 220, a pan/tilt speed adjustment unit 211, a zoom speed adjustment unit 212, a focus speed adjustment unit 213, a display unit 204, and a switch 205.

The pan/tilt operation unit 201 receives an input for instructing a driving unit on a driving speed in a pan direction or a tilt direction to change the imaging direction of the PTZ cameras 100 and 110. In the present exemplary embodiment, the pan/tilt operation unit 201 includes a joy stick, and the user can input a driving direction and a driving speed of the PTZ cameras 100 and 110 by tilting the joy stick. The direction in which the joy stick is tilted and the driving direction correspond to each other, and the driving speed corresponds to the tilt of the joy stick, that is, the shift amount by which the joy stick is tilted. The correspondence relation (input/output characteristics) will be described below. The control apparatus 200 receives an input to the pan/tilt operation unit 201 and outputs (transmits) a control signal to the pan driving unit and the tilt driving unit. In the present exemplary embodiment, the pan/tilt operation unit 201 is a joy stick, but may be a button-type operation unit such as a cross key, as long as a driving direction and a driving speed can be input.

The zoom operation unit 202 receives an instruction (input) for the zoom driving unit to move the zoom position to the tele-side or the wide side. In the present exemplary embodiment, the zoom operation unit 202 is configured in a button shape, and outputs (transmits) a control signal to the zoom driving unit in accordance with the shift amount by which the user presses the button. In the present exemplary embodiment, the zoom operation unit 202 has a button shape, but the shape is not limited to the example.

The focus operation unit 203 receives an instruction (input) for the focus driving unit to move the focus position to the NEAR side or the FAR side. The focus operation unit 203 is configured in a knob shape in the present exemplary embodiment, and outputs (transmits) a control signal for focus driving in accordance with a shift amount by which the user rotates the knob. In the present exemplary embodiment, the focus operation unit 203 has a knob shape, but the shape is not limited to the example.

The control communication terminal 220 is a terminal for transmitting a control signal to the PTZ cameras 100 and 101, and an example of the control communication terminal is an IP communication standard such as Ethernet. The standard is not limited to the example, and may be a serial communication standard such as RS-422.

Each of the pan/tilt speed adjustment unit 211, the zoom speed adjustment unit 212, and the focus speed adjustment unit 213 is configured in a knob shape. The user can adjust the upper limit value for the driving speed of each driving unit by rotating each knob. The upper limit value for the driving speed of each driving unit will be described in detail below.

The display unit 204 displays a preview video captured by the PTZ cameras 100 and 110 and a user interface. The display unit 204 includes, for example, a display such as a liquid crystal panel, but is not limited to the example.

(Switcher)

The switcher 300 includes video input terminals 301 and 302, a switch 305, a video output terminal 303, and a control communication terminal 304. The video input terminals 301 and 302 are terminals for receiving video signals output from the PTZ cameras 100 and 110, and a serial communication standard such as RS-422 is given as an example. The standard is not limited to the example, and may be an IP communication standard such as Ethernet.

The switch 305 is a switch for the user to select the camera from which the video is to be distributed, and the video signal of the selected camera is output from the video output terminal 303. In the present exemplary embodiment, four switches 1 to 4 are provided, and the user can select a camera to output a video from a maximum of four cameras. The switch 305 is turned on in a color corresponding to the tally light of the camera with a light emitting diode (LED) (not illustrated), and the user can recognize the distribution state of each camera from the color turned on in the switch 305. In the present exemplary embodiment, there are four switches 305, but the number is not limited to four. Instead of a physical switch, an interface displayed on a display such as a liquid crystal panel may be used.

The video output terminal 303 is connected to a distribution system and a recording apparatus (not illustrated), and outputs a video signal of a camera selected by the switch 305.

The control communication terminal 304 is a communication terminal for transmitting information regarding distribution, such as tally information indicating the distribution state of the camera, and is connected using an IP communication standard such as Ethernet in the present exemplary embodiment.

(Functional Configuration of Control Apparatus)

Figure 2A:
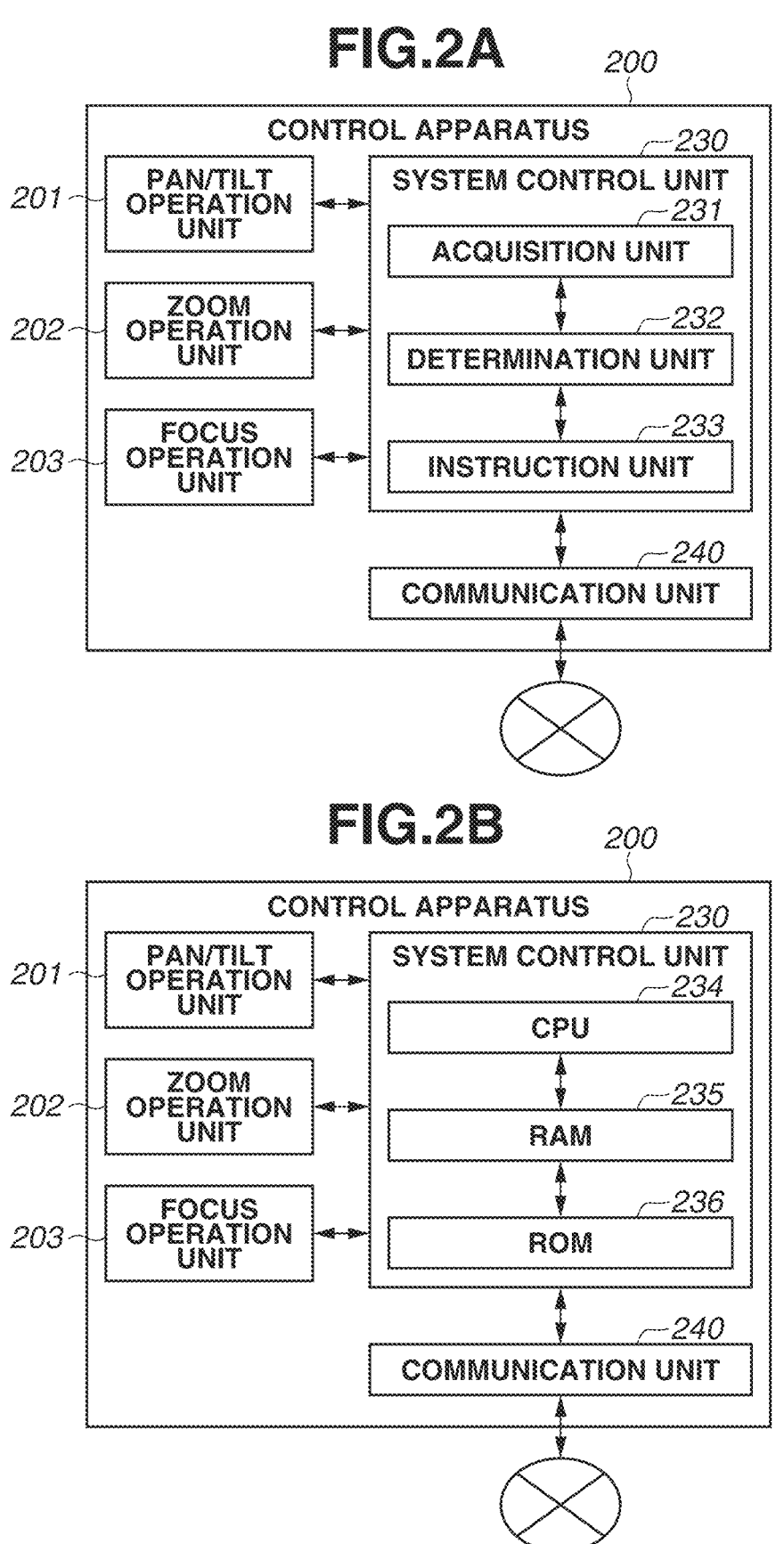
FIG. 2 is a hardware configuration diagram and a functional block diagram of the control apparatus.

FIG. 2A is a functional block diagram illustrating a configuration of the control apparatus 200 according to the present exemplary embodiment.

The control apparatus 200 includes the pan/tilt operation unit 201, the zoom operation unit 202, the focus operation unit 203, a system control unit 230, and a communication unit 240. When the user operates each operation unit, control and setting corresponding to each operation unit can be performed on the PTZ cameras 100 and 110.

The pan/tilt operation unit 201, the zoom operation unit 202, and the focus operation unit 203 each transmit a control signal corresponding to an input from the user to the system control unit 230. The system control unit 230 includes an acquisition unit 231, a determination unit 232, and an instruction unit 233. As illustrated in FIG. 2B, the system control unit 230 includes a central processing unit (CPU) 234, a random access memory (RAM) 235, and a read only memory (ROM) 236. Among the units illustrated in FIG. 2A, the acquisition unit 231, the determination unit 232, and the instruction unit 233 are functions implemented by software. Accordingly, these functions are implemented by loading a program stored in the ROM 236 into the RAM 235 and executing the program by the CPU 234.

The acquisition unit 231 acquires information regarding the distribution state of the camera to be operated, that is, tally information, via the communication unit 240 to be described below. The tally information may be acquired from the switcher 300 or may be acquired from the camera to be operated.

The determination unit 232 determines an input/output characteristic for determining a driving speed V with respect to an input signal from the pan/tilt operation unit 201, the zoom operation unit 202, or the focus operation unit 203. The determination unit 232 determines the input/output characteristic on the basis of the information regarding the distribution state of the camera to be operated, which is acquired by the acquisition unit 231.

The instruction unit 233 outputs a control signal for instructing on the driving speed V of each driving unit on the basis of the input/output characteristic determined by the determination unit 232 and the input signal to each operation unit. The processing flow and input/output characteristics of the functions of the system control unit 230 will be described in detail below.

The communication unit 240 transmits the control signal output from the system control unit 230 to the camera to be operated via the control communication terminal 220. That is, the control signal output from the instruction unit 233 is transmitted to the camera to be operated via the communication unit 240.

The control signal output from the instruction unit 233 may not necessarily be transmitted to the camera to be operated. For example, there is a case where the camera body does not include the pan driving unit and the tilt driving unit, and the camera body is fixed to a pan head including the pan driving unit and the tilt driving unit. In this case, the control signal is not transmitted to the camera body, but is output (transmitted) to the pan head. Accordingly, the driving unit for changing the imaging direction of the camera includes the driving unit of the pan head.

(Operation Description)

Figure 3:
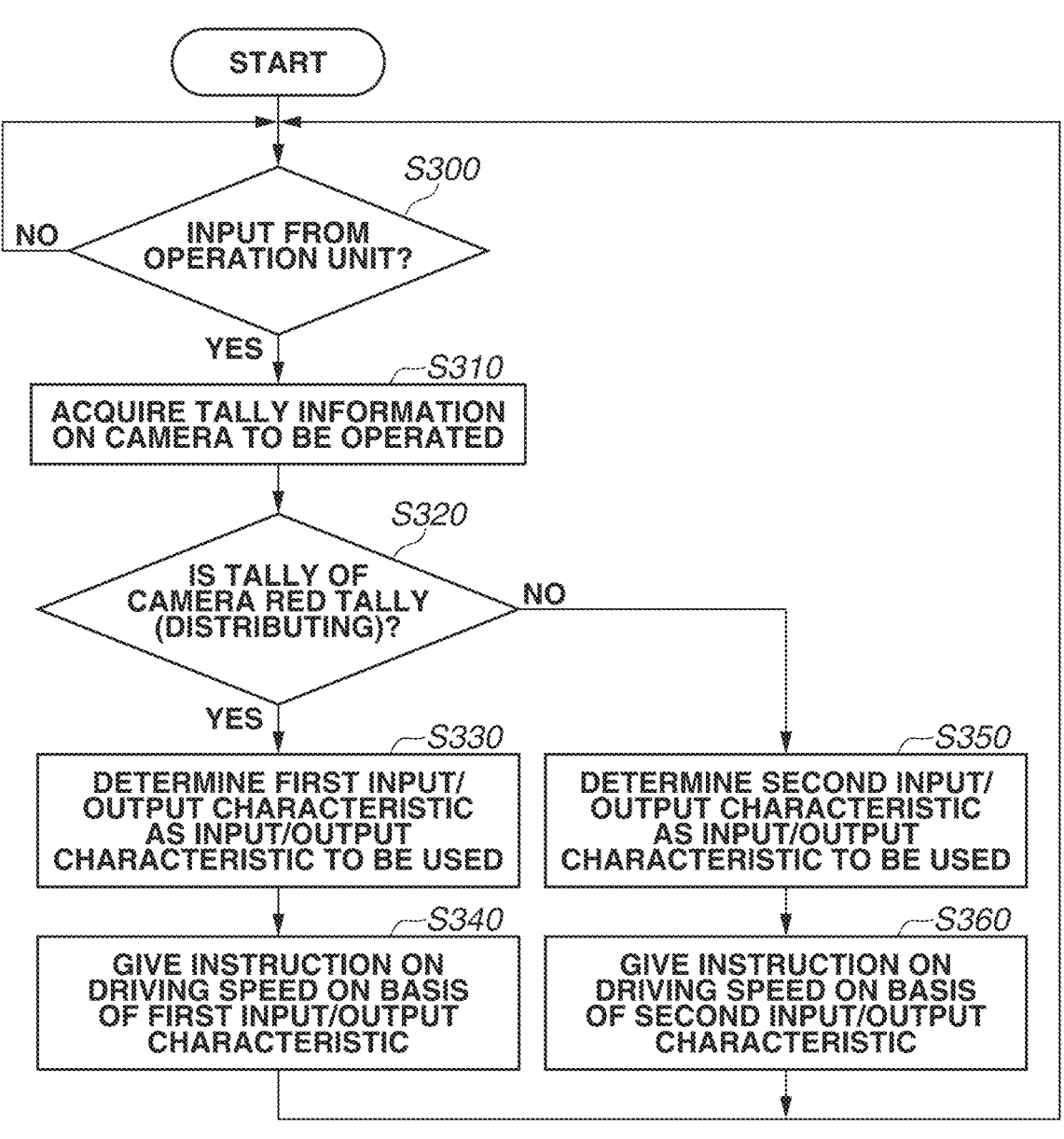
FIG. 3 is a flowchart illustrating a flow of control of the control apparatus.

FIG. 3 is a flowchart illustrating an operation of the control apparatus 200 according to the present exemplary embodiment. The operation of each step described in this flowchart is implemented by loading a program stored in the ROM 236 into the RAM 235 and executing the program by the CPU 234. Hereinafter, as an example, a case where the PTZ camera 100 is set as a camera to be operated and the user performs an input in the pan direction on the pan/tilt operation unit 201 will be described. The operation of this flowchart can also be applied to the tilt driving unit, the zoom driving unit, and the focus driving unit, and similar processing can also be performed in the PTZ camera 110.

In step S300, the system control unit 230 waits for an input from the pan/tilt operation unit 201. When there is an input to the pan/tilt operation unit 201 (Yes in step S300), the processing proceeds to step S310.

In step S310, the acquisition unit 231 acquires information (tally information) regarding the distribution state of the PTZ camera 100. As described above, the tally information may be acquired from the switcher 300 or may be directly acquired from the PTZ camera 100.

In step S320, the determination unit 232 determines the input/output characteristic indicating the relation of the driving speed V with respect to the input to the pan/tilt operation unit 201 on the basis of the acquired tally information. In a case where the distribution state of the PTZ camera 100 is a state of performing distribution (Yes in step S320), a first input/output characteristic is determined as the input/output characteristic used to calculate the control signal (step S330). On the other hand, in a case where the distribution state of the PTZ camera 100 is a state of not performing distribution (No in step S320), a second input/output characteristic is determined as the input/output characteristic to be used (step S330).

In step S340 and step S360, the instruction unit 233 determines the driving speed V in the pan direction or the tilt direction on the basis of the input/output characteristic determined by the determination unit 232 and the input signal to the pan/tilt operation unit 201. The determined driving speed V is output (transmitted) as a control signal to the PTZ camera 100 via the communication unit 240. To be more specific, a computation of converting an input signal into a control signal is performed on the basis of the determined input/output characteristic, and the control signal is output to the PTZ camera 100. The control signal for rotation at the driving speed V is output to the pan driving unit.

In the present exemplary embodiment, the case where the determination of the input/output characteristic and the output of the control signal to the PTZ camera 100 are performed in the same flowchart has been described. However, the determination of the input/output characteristic and the computation and output of the control signal may be separately performed. That is, the tally information of the PTZ camera 100 is acquired in advance before an input to the pan/tilt operation unit 201, and the input/output characteristic to be used is determined on the basis of the tally information. When there is an input to the pan/tilt operation unit 201, the determined input/output characteristic may be used without determining the distribution state. In this case, the tally information of the operation target may be continuously acquired periodically to update the input/output characteristic. As a result, it is not necessary to determine the input/output characteristic each time an operation is performed, and thus it is possible to more suitably convert an input signal into a control signal.

(Input/Output Characteristic)

Figure 4:
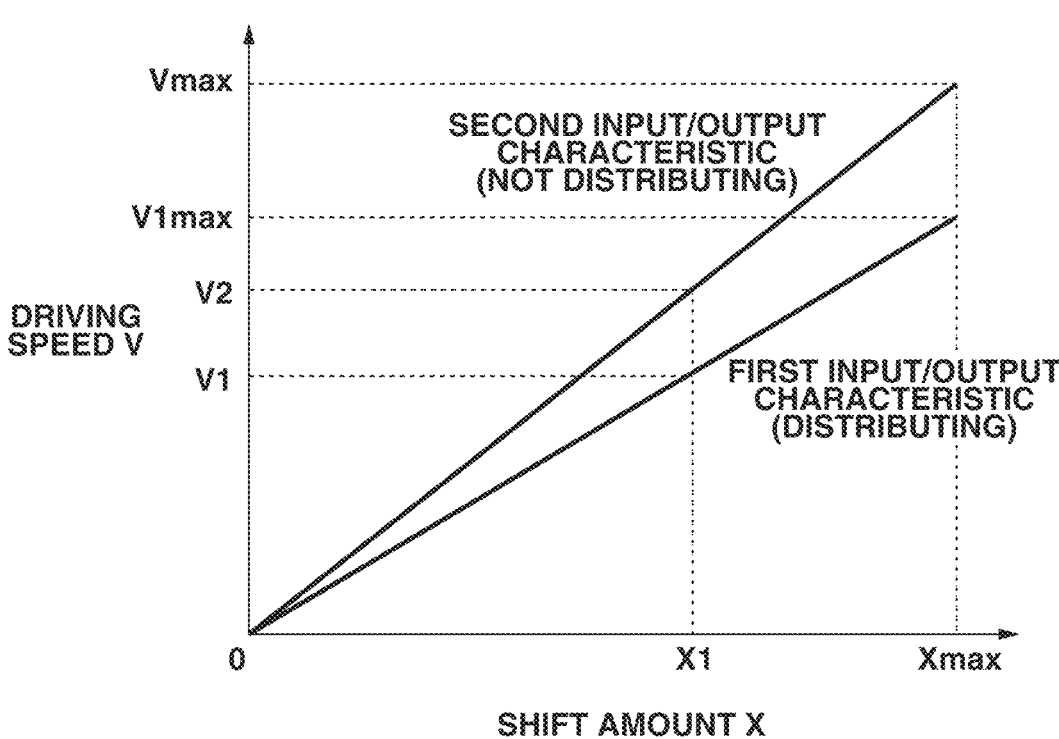
FIG. 4 is a conceptual diagram illustrating an input/output characteristic of a shift amount and a driving speed of an operation unit of the control apparatus.

FIG. 4 illustrates input/output characteristics when the camera to be operated is performing distribution and when the camera is not performing distribution. The horizontal axis represents the shift amount (input) of the pan/tilt operation unit 201, and the vertical axis represents the driving speed V (output). The shift amount is acquired in each of the pan direction and the tilt direction. As described above, in the present exemplary embodiment, a case where an input is made only in the pan direction will be described. Here, the shift amount is an amount indicating how much the joy stick is moved (or tilted) from a reference position, and the reference position indicates a position of the joy stick in a state where the joy stick is not operated.

FIG. 4 illustrates an output in a case where an input is made to the pan/tilt operation unit 201 with a shift amount X1 in the pan direction. In the first input/output characteristic and the second input/output characteristic illustrated in FIG. 4, the driving speed V is determined by a linear graph, and the tilt is different between the first input/output characteristic and the second input/output characteristic.

For example, while the PTZ camera 100 is performing distribution, the instruction unit 233 generates a driving speed V1 which is a speed parameter on the basis of the first input/output characteristic illustrated in FIG. 4 and outputs the driving speed V1 to the PTZ camera 100, and thus the pan driving unit is driven at the driving speed V1. On the other hand, in a case of the second input/output characteristic (the PTZ camera 100 is not performing distribution), the driving speed V2 faster than the driving speed V1 is generated with respect to the input signal of the same shift amount X1. In this way, for the same input to the pan/tilt operation unit 201, the driving speed output on the basis of the first input/output characteristic is slower than the driving speed output on the basis of the second input/output characteristic.

In other words, the slope of the linear graph of the first input/output characteristic is different from the slope of the graph of the second input/output characteristic, and the slope of the graph of the first input/output characteristic is smaller than the slope of the graph of the second input/output characteristic.

A driving speed Vmax illustrated in FIG. 4 is the maximum speed at which the pan driving unit of the PTZ camera 100 can be driven, and a shift amount Xmax on the horizontal axis indicates the maximum shift amount of the pan/tilt operation unit 201. The driving speed V1max at the operation unit shift amount Xmax of the first input/output characteristic illustrated in FIG. 4 is a speed upper limit value of the pan driving unit of the PTZ camera 100 during distribution.

In the present exemplary embodiment, the first input/output characteristic and the second input/output characteristic are set to be linear graphs. The first input/output characteristic includes a first upper limit value (V1max) and the second input/output characteristic (Vmax). Accordingly, the first input/output characteristic is determined on the basis of the first upper limit value, and the second input/output characteristic is determined on the basis of the second upper limit value.

In the field of video production, it is required to quickly adjust a camera that is not performing distribution to a desired angle of view. Meanwhile, because it is necessary to change the angle of view of the camera during distribution while maintaining the quality of the video, the camera that is performing distribution needs to be operated at a lower driving speed than the camera that is not performing distribution.

In a conventional technique, an upper limit value can be set for the driving speed, and the user adjusts the upper limit value of the camera that is performing distribution and the upper limit value of the camera that is not performing distribution. However, the conventional method of manually setting the upper limit value takes time and effort, for example, the user needs to go through a process of checking a tally lamp to determine whether the camera to be operated is a camera that is performing distribution or a camera that is not performing distribution. According to the present exemplary embodiment, by automatically switching the input/output characteristic on the basis of the tally information, it is possible to more appropriately control the driving speed in the pan direction or the tilt direction in accordance with the distribution state of the operation target.

As described above, not only the driving speed in the pan direction or the tilt direction but also the driving speed of the zoom driving unit and the focus driving unit can use a different input/output characteristic between the distribution state and the non-distribution state. However, it is necessary to make the input/output characteristic different from the driving speed in the pan direction or the tilt direction. Different sets of input/output characteristics may be used for the pan direction and the tilt direction.

The control apparatus 200 according to a second exemplary embodiment includes the pan/tilt speed adjustment unit 211, the zoom speed adjustment unit 212, and the focus speed adjustment unit 213 illustrated in FIG. 1. The pan/tilt speed adjustment unit 211 is a setting unit that can set the upper limit value of the driving speed of the pan driving unit and the tilt driving unit of the PTZ cameras 100 and 110, and is arranged in the vicinity of the pan/tilt operation unit 201.

The zoom speed adjustment unit 212 can set the upper limit value of the driving speed of the zoom driving unit of the PTZ cameras 100 and 110, and is arranged in the vicinity of the zoom operation unit 202.

The focus speed adjustment unit 213 can set the upper limit value of the driving speed of the focus driving unit of the PTZ cameras 100 and 110, and is arranged in the vicinity of the focus operation unit 203.

Figure 5:
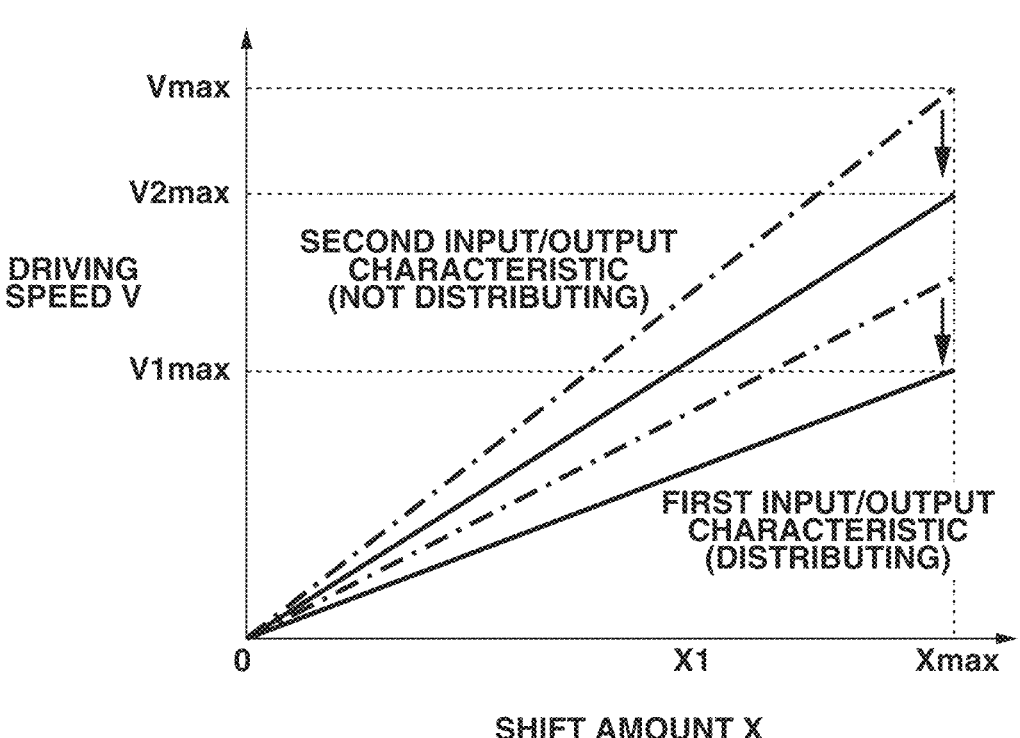
FIG. 5 is a conceptual diagram illustrating input/output characteristic of a shift amount and a driving speed of the operation unit of the control apparatus when an upper limit value of the driving speed is changed.

FIG. 5 illustrates an input/output characteristic when the upper limit value of the driving speed is changed from the input/output characteristic of FIG. 4. A broken line indicates the input/output characteristic before the upper limit value of the driving speed is changed, that is, the input/output characteristic in FIG. 4, and a solid line indicates the input/output characteristic after the upper limit value of the driving speed is changed.

As in the first exemplary embodiment, when the user operates the pan/tilt speed adjustment unit 211 to change the upper limit value Vmax of the driving speed of the pan driving unit in the non-distribution state to V2max, the second input/output characteristic changes in accordance with the change of the upper limit value, as illustrated in FIG. 5. The slope of the linear graph of the second input/output characteristic decreases as the upper limit value is changed.

As illustrated in FIG. 5, the first input/output characteristic and the driving speed Vmax also change as the upper limit value is changed. To be more specific, the first upper limit value (V1max) included in the first input/output characteristic is changed on the basis of the difference between the second upper limit value (Vmax) included in the second input/output characteristic and the changed second upper limit value (V2max). The first upper limit value may be calculated on the basis of the second upper limit value. For example, the first upper limit value can be calculated using the following formula.

$$V1\max = \alpha * V\max(0 < \alpha < 1) \qquad \text{(formula 1)}$$

The α allows the magnification with respect to the maximum speed to be adjusted by moving the knob of the pan/tilt speed adjustment unit 211. When the first upper limit value is changed, it is desirable not to change the second upper limit value in accordance with the change of the first upper limit value. According to the present exemplary embodiment, even after the second upper limit value is changed, the relative magnitude relation between the first input/output characteristic and the second input/output characteristic can be maintained. Even when the user changes the speed upper limit value in the distribution state, it is possible to perform an operation at a driving speed at which the viewer can easily view during the distribution. Meanwhile, because the camera can be quickly operated to a desired angle of view in the non-distribution state, the camera can be operated at an appropriate speed according to the distribution state.

The apparatus configuration and the functional configuration of the control apparatus 200 according to a third exemplary embodiment are the same as those of the first and second exemplary embodiments, and thus the description of the apparatus configuration and the functional configuration of the control apparatus will be omitted.

Figure 6A:
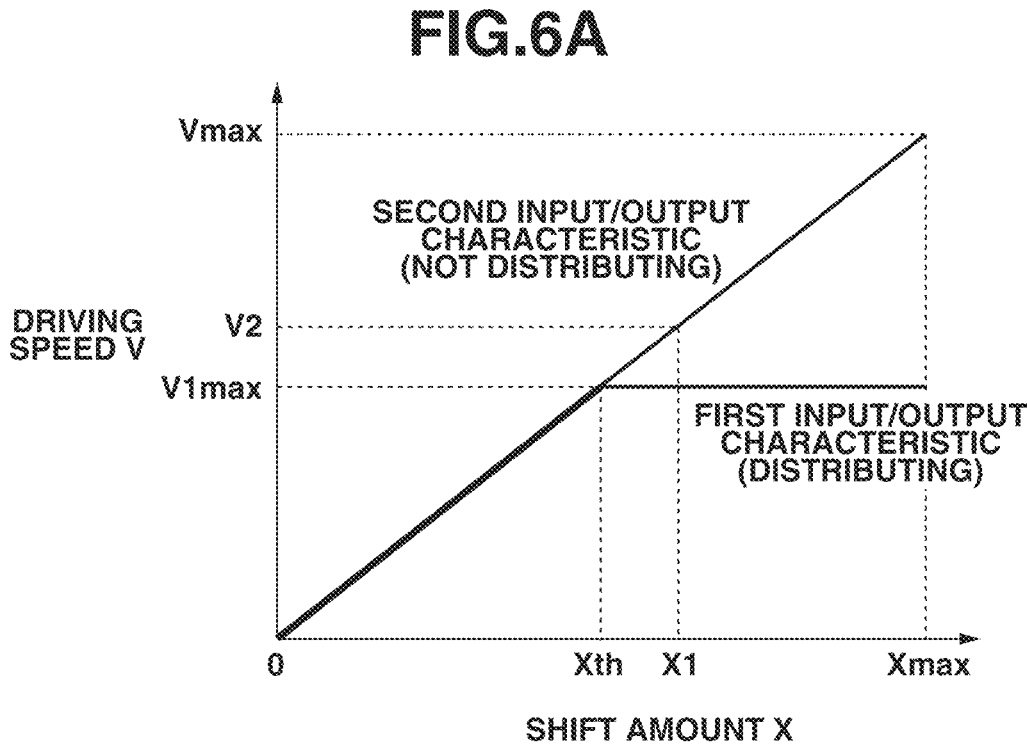
FIGS. 6A and 6B are conceptual diagrams illustrating input/output characteristic of a shift amount and a driving speed of the operation unit of the control apparatus.
Figure 6B:
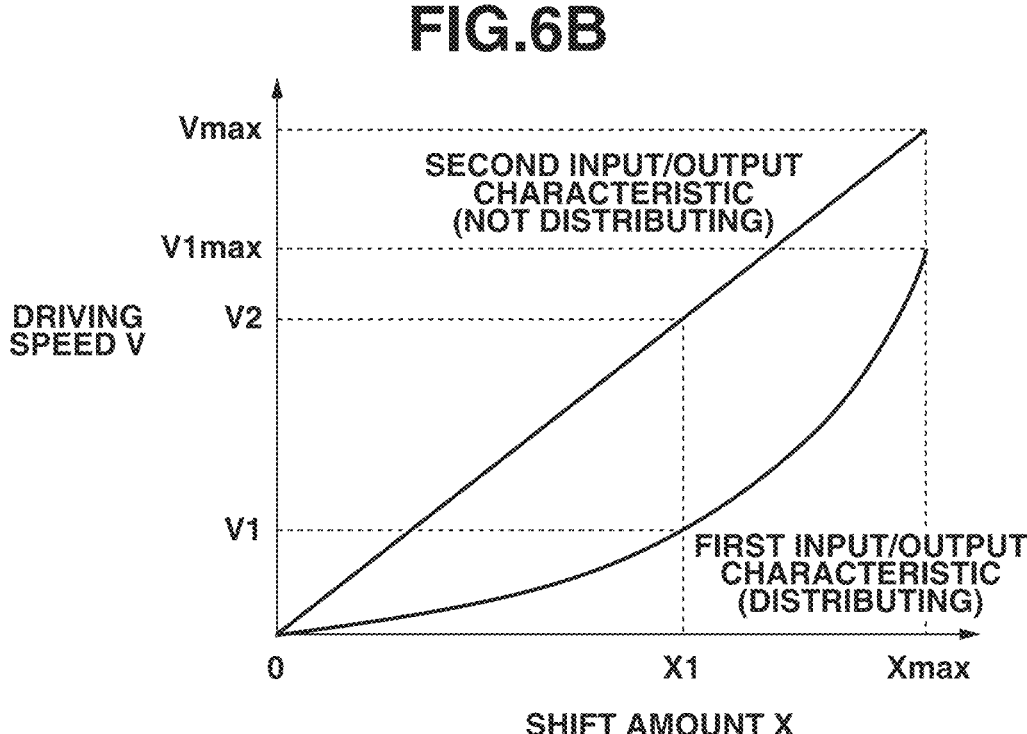

In the present exemplary embodiment, a case where graphs having different properties are used for the first input/output characteristic and the second input/output characteristic will be described. FIGS. 6A and 6B are diagrams illustrating the driving speed and the input/output characteristics determined by the determination unit 232, similarly to FIG. 4.

The difference from FIG. 4 is that the first input/output characteristic has nonlinearity. That is, the input/output characteristic for a camera in the non-distribution state has linearity as in the first and second exemplary embodiments.

The input/output characteristics illustrated in FIG. 6A will be described. Because the second input/output characteristic is the same as that in FIG. 4, the description of the second input/output characteristic will be omitted. Accordingly, the first input/output characteristic will be described. The first input/output characteristic is the same input/output characteristic as the second input/output characteristic up to a predetermined shift amount Xth, and when a shift amount equal to or larger than the predetermined shift amount Xth is input to the pan/tilt operation unit 201, the driving speed to be output is set to be constant (first upper limit value).

The input/output characteristics illustrated in FIG. 6B will be described. Because the second input/output characteristic is the same as that in FIG. 4, the description of the second input/output characteristic will be omitted. Accordingly, the first input/output characteristic will be described. The first input/output characteristic illustrated in FIG. 6B is a curved line, and is set in such a manner that the driving speed is calculated with high sensitivity with respect to the shift amount as the shift amount input to the pan/tilt operation unit increases.

The setting of the first input/output characteristic is not limited to the example. That is, in addition to the above, various customizations can be made to the operation unit as long as the input/output characteristic is adjusted to be different from the second input/output characteristic.

At a site of video production, there are cases where the operability of the camera that is performing distribution is desired to be changed in accordance with the user's preference or a shooting scene. However, because it is important for the camera in the non-distribution state to be able to quickly change the angle of view, there is a possibility that the setting (input/output characteristic) of the control apparatus 200 for the camera that is performing distribution may be a cause that hinders adjustment of the camera in the non-distribution state.

According to the present exemplary embodiment, it is possible to perform control using different input/output characteristics in accordance with the distribution state of the operation target, and thus it is possible to quickly change the angle of view of a camera that is not performing distribution while customizing the operability of a camera that is performing distribution in accordance with the user's preference.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-103416, filed Jun. 23, 2023, which is hereby incorporated by reference herein in its entirety.

What is claimed is:

1. A control apparatus comprising:

at least one memory storing instructions; and at least one processor, wherein execution of the stored instructions causes the at least one processor to:

select an imaging device to be operated from at least one imaging device communicatively connected to the control apparatus;

acquire information indicating whether the selected imaging device is performing distribution;

acquire an input signal for instructing a driving mechanism of the selected imaging device to change an imaging direction of the selected imaging device in a pan direction or a tilt direction; and generate and output a control signal corresponding to the input signal using the acquired information, the control signal being a signal that is output to the driving mechanism and that indicates a driving speed at which the driving mechanism is to change the imaging direction of the selected imaging device, wherein the driving speed indicated by the control signal is a first driving speed that is generated based on a first input/output characteristic in a case where the selected imaging device is performing distribution, and the driving speed indicated by the control signal is a second driving speed that is generated based on a second input/output characteristic different from the first input/output characteristic in a case where the imaging device is not performing distribution, and wherein the first driving speed is different from the second driving speed.

2. The control apparatus according to claim 1, wherein the first driving speed is slower than the second driving speed.

3. The control apparatus according to claim 1, wherein the first input/output characteristic includes a first upper limit value of the driving speed indicated by the control signal, wherein the second input/output characteristic includes a second upper limit value of the driving speed indicated by the control signal, and wherein the first upper limit value is smaller than the second upper limit value.

4. The control apparatus according to claim 3, wherein execution of the stored instructions further causes the at least one processor to determine the first input/output characteristic based on the first upper limit value and determine the second input/output characteristic based on the second upper limit value.

5. The control apparatus according to claim 3, wherein the second upper limit value is a maximum speed at which the driving mechanism can drive.

6. The control apparatus according to claim 3, wherein execution of the stored instructions further causes the at least one processor to determine the first upper limit value based on the second upper limit value.

7. The control apparatus according to claim 3, wherein execution of the stored instructions further causes the at least one processor to set the first upper limit value and the second upper limit value.

8. The control apparatus according to claim 1, wherein the input signal indicates an instructed driving speed.

9. A control apparatus comprising;

at least one memory storing instructions; and at least one processor, wherein execution of the stored instructions causes the at least one processor to:

select an imaging device to be operated from at least one imaging device communicatively connected to the control apparatus;

acquire information indicating whether the selected imaging device is performing distribution;

acquire an input signal for instructing a driving mechanism of the selected imaging device to change a zoom or focus of the selected imaging device at an instructed driving speed; and generate and output a control signal corresponding to the input signal using the acquired information, the control signal being a signal that is output to the driving mechanism and that indicates a driving speed at which the driving mechanism is to change the zoom or focus of the selected imaging device, wherein the driving speed indicated by the control signal is a first driving speed that is generated based on a first input/output characteristic in a case where the selected imaging device is performing distribution, and the driving speed indicated by the control signal is a second driving speed that is generated based on a second input/output characteristic different from the first input/output characteristic in a case where the imaging device is not performing distribution, and wherein the first driving speed is different from the second driving speed.

10. The control apparatus according to claim 9, wherein the first driving speed output is slower than the second driving speed.

11. The control apparatus according to claim 9, wherein the first input/output characteristic includes a first upper limit value of the driving speed indicated by the control signal, wherein the second input/output characteristic includes a second upper limit value of the driving speed indicated by the control signal, and wherein the first upper limit value is smaller than the second upper limit value.

12. A control method comprising:

selecting an imaging device to be operated from at least one imaging device communicatively connected to a control apparatus;

acquiring information indicating whether the selected imaging device is performing distribution;

acquiring an input signal for instructing a driving mechanism of the selected imaging device to change an imaging direction of the imaging device in a pan direction or a tilt direction; and generating and outputting a control signal corresponding to the input signal using the acquired information, the control signal being a signal that is output to the driving mechanism and that indicates a driving speed at which the driving mechanism is to change the imaging direction of the selected imaging device, wherein the driving speed indicated by the control signal is a first driving speed that is generated based on a first input/output characteristic in a case where the selected imaging device is performing distribution, and the driving speed indicated by the control signal is a second driving speed that is generated based on a second input/output characteristic different from the first input/output characteristic in a case where the imaging device is not performing distribution, and wherein the first driving speed is different from the second driving speed.

13. The control method according to claim 12, wherein the input signal indicates an instructed driving speed.

14. A non-transitory computer-readable medium storing computer-executable instructions for causing a computer execute a method comprising:

selecting an imaging device to be operated from at least one imaging device communicatively connected to a control apparatus;

acquiring information indicating whether the selected imaging device is performing distribution;

acquiring an input signal for instructing a driving mechanism of the selected imaging device to change an imaging direction of the selected imaging device in a pan direction or a tilt direction; and generating and outputting a control signal corresponding to the input signal using the acquired information, the control signal being a signal that is output to the driving mechanism and that indicates a driving speed at which the driving mechanism is to change the imaging direction of the selected imaging device, wherein the driving speed indicated by the control signal is a first driving speed that is generated based on a first input/output characteristic in a case where the selected imaging device is performing distribution, and the driving speed indicated by the control signal is a second driving speed that is generated based on a second input/output characteristic different from the first input/output characteristic in a case where the imaging device is not performing distribution, and wherein the first driving speed is different from the second driving speed.

\* \* \* \* \*